United States Patent [19]

Zimmermann et al.

[11] Patent Number: 5,284,667
[45] Date of Patent: Feb. 8, 1994

[54] ROLLED FOOD ITEM FABRICATING METHODS

[75] Inventors: Craig E. Zimmermann, Waconia; Rene K. Merle, Crystal, both of Minn.

[73] Assignee: General Mills, Inc., Minneapolis, Minn.

[21] Appl. No.: 17,881

[22] Filed: Feb. 16, 1993

Related U.S. Application Data

[62] Division of Ser. No. 646,715, Mar. 4, 1991, Pat. No. 5,205,106.

[51] Int. Cl.$^5$ .......................... A23L 1/00; B65B 35/00
[52] U.S. Cl. ..................... 426/420; 426/383; 426/414; 426/517
[58] Field of Search ............... 426/297, 410, 414, 420, 426/501, 515, 517, 518, 383; 53/118, 122, 136.3, 202, 514; 425/362, 363

[56] References Cited

U.S. PATENT DOCUMENTS

| | | | |
|---|---|---|---|
| 1,873,716 | 8/1932 | Nickerson | 426/420 X |
| 2,227,728 | 1/1941 | Lombi | 53/546 X |
| 2,663,130 | 12/1953 | Donofrio | 53/122 |
| 2,726,156 | 12/1955 | Armstrong | 426/410 X |
| 3,188,780 | 6/1965 | Mead | 53/122 |
| 3,225,717 | 12/1965 | Page | 426/501 |
| 3,869,845 | 3/1975 | Rodach et al. | 53/136.3 |
| 3,956,517 | 5/1976 | Curry et al. | 426/517 X |
| 4,121,956 | 10/1978 | Sample | 426/383 |
| 4,205,951 | 6/1980 | Sollich | 426/517 X |
| 4,307,555 | 12/1981 | Mlodozeniec et al. | 53/546 X |
| 4,630,426 | 12/1986 | Gentry | 53/546 X |
| 4,849,230 | 7/1989 | Varvello | 426/501 X |
| 4,850,087 | 7/1989 | Gronau | 242/67.2 R X |

Primary Examiner—George Yeung
Attorney, Agent, or Firm—John A. O'Toole; L. MeRoy Lillehaugen

[57] ABSTRACT

A rolled food item is fabricated by advancing food (14) and a sheet of support material (16) between the rollers (18, 20) of a strip sheeter (12) where the food (14) fills grooves (24) of the first roller (18) to deposit the food (14) in continuous strips on the support material (16). After passing through a cooling tunnel (58), the support material (16) is also cut into strips between the strips of food (14) in a first cutting section (62). The multiplicity of strips are then cut to lengths in a second cutting section (64). Labels (68) are secured to the trailing ends of the strips and the trailing ends of the strips are pressed by a label presser (70) to adhere the labels (68) to the strips. The strips are simultaneously rolled in a roll-up section (74) including a rotatable fork (76). Specifically, after the leading ends of the strips are inserted between the legs (78, 80) of the fork (76), the fork (76) is rotated to roll the strips on the fork (76). A pressure plate (90) is moved to abut with the rolls located on the fork (76) to adhere the trailing end portions of the labels (68) to the rolls. The fork (76) is moved transversely to axially slide the rolls from the fork (76). Guide fingers (96) are insertable between the strips to insure that the strips remain in their individual lanes while being rolled on the fork (76).

20 Claims, 1 Drawing Sheet

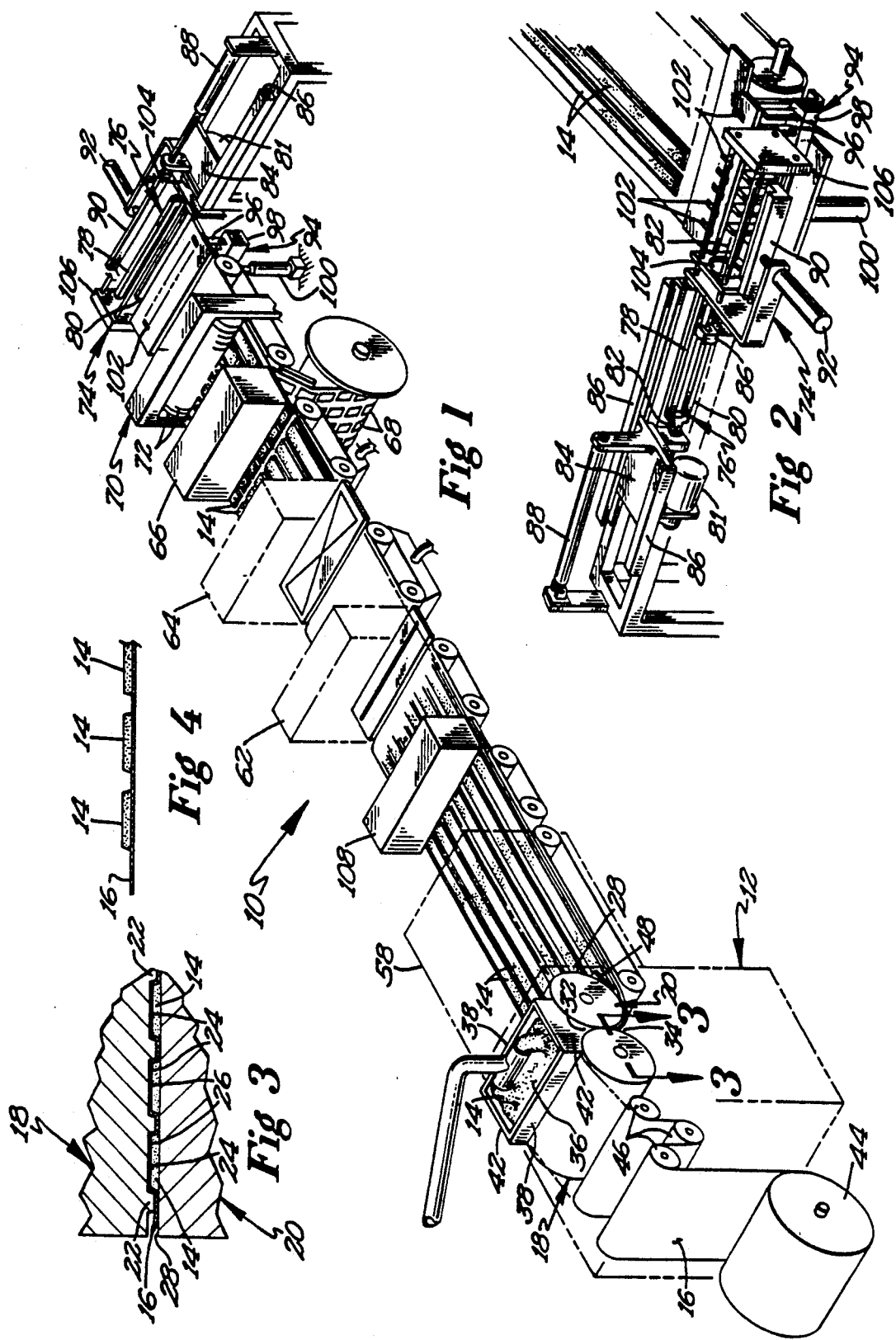

ROLLED FOOD ITEM FABRICATING METHODS

This is a division of application Ser. No. 07/664,715, filed Mar. 4, 1991, now U.S. Pat. No. 5,205,106.

BACKGROUND

The present invention generally relates to apparatus and methods for fabricating food items, particularly to apparatus and methods for fabricating rolled food items, and more particularly to apparatus and methods for fabricating a coil of food supported on support material.

The sale of snack-type food products is a highly competitive business. In addition to the particular food components, increasingly the novelty and play value of the product are important in the marketability of any particular food item. For example, fruit-based snack products such as FRUIT ROLL-UPS TM fruit products have found wide market acceptance. Likewise, U.S. Pat. No. 4,882,175 recognized the enhanced marketability of chewing gum in the form of a rolled-up tape allowing the consumer the chance to break off the desired size of piece to chew, saving the rest for later.

While rolled food items are known, many foods such as dehydrated fruit puree do not lend themselves to forming rolled food items where the food is in a strip of a thinness generally requiring external support, with the support material and the food supported thereon being rolled into a coil creating a novelty form of merchandizing for that food.

Accordingly, it is an object of the present invention to provide novel apparatus and methods for the fabrication of food items, which in the preferred form are rolled, and which in the most preferred form include a thin strip of food coiled with a strip of support material.

Another object of the invention is to provide apparatus and methods where the food is deposited as strips on the support material such that longitudinal cutting of the food to form the strips is not required. In this regard, an aim of the invention is to deposit the food as strips on a continuous sheet of support material with the support material being cut into strips between the strips of food supported thereon.

Yet another object of the invention is to provide apparatus and methods where multiple strips having widths which are minimal relative to their lengths are simultaneously rolled into a coiled condition without interconnection of the strips.

SUMMARY

Surprisingly, the above objectives can be satisfied in the field of food fabrication by providing, in the preferred form, apparatus and methods of food fabrication where multiple lengths of strips of support material and food supported thereon are formed by cutting a sheet of support material between strips of food deposited on the sheet and by cutting across the food and support material at the desired length, with the strips being simultaneously rolled into independent coils.

In other aspects of the present invention, apparatus and methods of depositing multiple strips of food on a sheet of support material are provided where the sheet is pulled through oppositely rotating, abutting, first and second rollers, with the first roller including a plurality of spaced, parallel, circumferential lands defining grooves or depressions into which the food fills as the sheet and food advance between the rollers.

In yet other aspects of the present invention, apparatus and methods of rolling a strip of support material having food supported thereon are provided where the leading end of the strip is extended between the legs or tines of a fork which is then rotated until the strip is wound on the legs or tines of the fork, with the fork being axially slid relative to the rolled strip to remove the rolled strip from the fork.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a diagrammatic, perspective view of an apparatus for fabricating a rolled food item according to the preferred teachings of the present invention.

FIG. 2 shows a rear, perspective view of the roll-up section of the apparatus of FIG. 1.

FIG. 3 shows a partial, cross-sectional view of the strip sheeter of the apparatus of FIG. 1 according to section line 3—3 of FIG. 1.

FIG. 4 shows a partial, cross-sectional view of the strips of food deposited on a sheet of support material by the strip sheeter of the apparatus of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "end", "axial", "longitudinal", "width", "height", and similar terms are used herein, it should be understood that these terms have reference only to the structure shown in the drawings as it would appear to a person viewing the drawings and are utilized only to facilitate describing the invention.

DESCRIPTION

An apparatus utilizing the present methods for fabricating a food item, especially a dehydrated fruit puree, on a continuous strip of support material, with the food and support material being rolled to produce the food item, according to the preferred teachings of the present invention is shown in the drawings and generally designated 10. Apparatus 10 includes a strip sheeter 12 for forming a plurality of spaced, parallel, narrow strips of food 14 of a thinness requiring external support upon a continuous web or sheet of support material 16. In the most preferred form, food 14 is a sweetened dehydrated fruit-based material typically referred to in the art as a fruit leather which can be derived from fruit purees and in the most preferred form is of the same type as utilized in the first, solid or "hard" portion or region of the dual textured food piece described in U.S. Pat. No. 4,847,098 issued Jul. 11, 1989 to J. E. Langler and in U.S. Pat. No. 4,853,236 issued Aug. 1, 1989 to J. E. Langler, each entitled Dual Textured Food Piece of Enhanced Stability and each of which is hereby incorporated herein by reference. Support material 16 may be formed of any suitable material such as silicon parchment paper which has the necessary strength to support food 14 without tearing and without bulkiness to allow rolling of food 14 and support material 16 into a compact food piece and which allows food 14 to be easily separated therefrom for consumption.

Strip sheeter 12 generally includes first and second press rollers 18 and 20. In the preferred form, roller 20 is heated by any suitable means, not shown, such as by steam, to a temperature corresponding to the initial temperature of food 14 and in the preferred form in the order of 170° F. (77° C.). The periphery of roller 18 is grooved and specifically includes a plurality of spaced, parallel, circular, circumferential bands or lands 22 separating, forming and defining a plurality of spaced, parallel, annular depressions or grooves 24 around the periphery of roller 18. The spacing between lands 22 or in other words the width of depressions or grooves 24 is generally equal to the desired width of the strips of food 14 and the height of lands 22 or in other words the depth of depressions or grooves 24 is generally equal to the desired thickness of the strips of food 14. The width of lands 22 between depressions or grooves 24 is generally equal to the desired spacing between the strips of food 14 which in the preferred form is in the order of one-eighth inch (one-third centimeter). The bottoms 26 of grooves 24 are cylindrical in configuration and are relatively smooth. Roller 20 includes a cylindrical periphery 28 which is relatively smooth. Rollers 18 and 20 are rotatably mounted in an abutting relation, with periphery 28 of roller 20 engaging and rolling upon lands 22 of roller 18 along an abutment nip. In the most preferred form, rollers 18 and 20 are generally cylindrical and of equal diameters. Rollers 18 and 20 are rotated in opposite rotational directions to define an upper, mating side 32 and a lower, exit side 34. To allow cleaning, roller 20 may be slideably mounted relative to roller 18 to allow separation of roller 20 from roller 18.

Food 14 heated to a temperature to become flowable or pumpable is filled into upper mating side 32, with a containment bin or saddle 36 being provided complementary to and for holding food 14 above and evenly feeding material to and within mating side 32. In the preferred form, bin or saddle 36 includes first and second cross bars 38 extending axially across and engaging rollers 18 and 20, respectively. Bin 36 further includes end pieces 42 extending radially between and engaging the peripheries of rollers 18 and 20 and between cross bars 38. In the most preferred form, cross bars 38 extend generally parallel to and end pieces 42 extend generally perpendicular to the rotational axes of rollers 18 and 20. Food 14 is then pumped into bin 36 where it flows by gravity to rollers 18 and 20.

Support material 16 typically is supplied from a roll 44 and after extending around the customary tension rollers 46 is threaded to extend under cross bar 38 of saddle 36 engaging roller 18, over lands 22 and grooves 24 of the periphery of roller 18 located within bin 36 and mating side 32, and to extend between the nip of rollers 18 and 20 into exit side 34. Food 14 is initially located in mating side 32 intermediate support material 16 and second roller 20. In exit side 34, support material 16 is pulled typically by vacuum conveyors downstream from strip sheeter 12 to extend under periphery 28 of roller 20 within exit side 34 and then extend with a small amount of tension generally tangentially therefrom.

It can then be appreciated that as food 14 and support material 16 is pulled between the abutment nip between rollers 18 and 20 by the rotation of rollers 18 and 20, food 14 and support material 16 advancing between rollers 18 and 20 will be compressed into grooves 24 such that food 14 will be deposited in continuous, spaced, parallel, narrow, thin strips upon support material 16, with the number, width and height of the strips of food 14 corresponding to the number, width and depth of grooves 24 and the spacing between the strips of food 14 corresponding to the width of bands or lands 22 between grooves 24.

As food 14 is hot and may have a tackiness to stick or adhere to roller 20, a scraper 48 is provided to scrape food 14 which may adhere to roller 20. In the most preferred form, scraper 48 has a straight leading edge which flushly engages periphery 28 of roller 20. Scraper 48 is canted 15° to 30° from the horizontal and is arranged to engage roller 20 and extend generally tangentially therefrom at a position slightly past the lowermost point of roller 20 on the side opposite to roller 18. Scraper 48 in the preferred form is formed of hardened steel which is not susceptible to wear from the continuous engagement with roller 20, with roller 20 also being heated which may soften other materials resulting in wear. Scraper 48 further includes a thin anti-stick coating such as Teflon ®. Thus, in operation, scraper 48 mechanically scrapes any food 14 off roller 20 which is then pushed onto scraper 48. Because of its non-wear characteristics, scraper 48 can be relatively thin to maximize removal of food 14 from and cleaning of roller 20. Further, due to its anti-stick coating, food 14 removed by scraper 48 will tend to fall by gravity when it travels upon scraper 48 and specifically does not tend to adhere or stick to scraper 48. If food 14 were to stick to scraper 48, food 14 would tend to bunch up and fall as the bunches grew to a size which would fall by gravity and not remain in strips on support material 16 as desired in the present invention.

It can be appreciated that support material 16 separates food 14 from roller 18 and should prevent food 14 from adhering thereto. However, if a problem should arise, such as food which could flow around the ends of support material 16 or through breaks or tears in support material 16, a suitable scraper can be provided for roller 18 also.

After strip sheeter 12, the sheet of support material 16 having strips of food 14 thereon is passed through a cooling tunnel 56. Cooling tunnel 58 is provided with forced chilled air typically cooled to an air temperature in the range of 32°–40° F. (0°–4° C.) and support material 16 and strips of food 14 remain in cooling tunnel 58 a sufficient time to cool from approximately 170° F. (77° C.) to 100° F. (38° C.). Support material 16 can be supported within cooling tunnel 58 on a stationary platform or on a moving platform such as a conveyor.

After cooling tunnel 58, support material 16 having strips of food 14 is passed onto a conveyor. The strips of food 14 can then be further processed at this time at optional stations such as by embossing as will be described further hereinafter.

While traveling along apparatus 10, after cooling tunnel 58, support material 16 and food 14 is advanced in apparatus 10 on a platform or conveyor to a first cutting section 62. Support material 16 is cut into strips in a first cutting section 62, with the cuts being made in the spacing between strips of food 14 located thereon to form longitudinally extending, continuous, multiple strips of support material 16 and food 14 supported thereon. It should be noted that cutting occurs only through support material 16 and specifically cutting food 14 longitudinally does not occur as strips of food 14 were previously formed by strip sheeter 12. In the most preferred form, the cutting is performed in cutting section 62 by and the apparatus of cutting section 62 essentially comprises a plurality of spaced, stationary water knives arranged parallel to each other and transverse to the direction of travel of support material 16 moving past the knives. Water knives are advantageous since less dust is created which could contaminate food 14, no jagged edges are formed on the strips of support material 16, and there are no blades which require sharpening or replacement. Apparatus 10 is equipped with a sensor to pick up one edge of the strip of food 14 to transversely move the water knives relative to the direction of travel of support material 16 to maintain slitting in the voids or spacing between the strips of food 14.

Continuing along apparatus 10, after first cutting section 62, the strips of food 14 and support material 16 are passed onto a powered or driven vacuum platen or conveyor. It can be appreciated that the vacuum conveyor places a vacuum force on support material 16 to thereby grip support material 16. It can then be appreciated that the vacuum conveyor places the pulling or tension force on support material 16 for pulling support material 16 downstream from strip sheeter 12, for pulling support material 16 through cooling tunnel 58, first cutting section 62, and any other intermediate steps such as embossing. Further, it can be appreciated that due to the vacuum force applied by the vacuum conveyor, positive control of support material 16 and food 14 located thereon is obtained.

After first cutting section 62 and the driven vacuum conveyor, the strips of food 14 and support material 16 are cut to lengths in a second cutting section 64. In the most preferred form, the cutting is performed in cutting section 64 by a water knife arranged to move diagonally back and forth across the strips of food 14 and support material 16 as they move thereby. Further in the most preferred form, in the cutting operation of cutting section 64, the water knife moves diagonally from a first, upstream corner outside of the strips of food 14 and support material 16 diagonally across the strips of food 14 and support material 16 to a second, downstream corner outside of the strips of food 14 and support material 16. The water knife then resets, moving upstream outside of and parallel to the strips of food 14 and support material 16 to a third, upstream corner outside of the strips of food 14 and support material 16 and on the same side of the strips of food 14 and support material 16 as the second, downstream corner but on the opposite side of and across from the strips of food 14 and support material 16 as the first, upstream corner. In the next cutting operation, the water knife moves diagonally from the third, upstream corner across the strips of food 14 and support material 16 to a fourth, downstream corner outside of the strips of food 14 and support material 16 on the same side of the strips of food 14 and support material 16 as the first, upstream corner but on the opposite side of and across from the strips of food 14 and support material 16 as the second, downstream corner. The water knife then again resets, moving upstream outside of and parallel to the strips of food 14 and support material 16 back to the first, upstream corner where the water knife will repeat the same movement paths. Thus, the water knife follows a bow-tie type path as shown in the bottom plate or anvil of cutting section 64 in FIG. 1.

It can then be appreciated that due to the forward movement of strips of food 14 and support material 16 as the water knife is moving diagonally, the strips of food 14 and support material 16 are cut generally perpendicular to the side edges of and generally straight across the strips of food 14 and support material 16. In cutting section 64, strips of food 14 and support material 16 are cut to a finite length which in the preferred form is generally equal to 36 inches (1 meter), with each strip having a leading end and a trailing end.

It can be appreciated that water from the water knives tends to create a tension force between support material 16 and the bottom plate or anvil under the water knives and upon which support material 16 slides. In cutting section 62, the continuity of strips of food 14 and support material 16 and the pulling force by the vacuum conveyor can be relied upon to pull the strips of food 14 and support material 16 over the bottom plate or anvil past the water knives in cutting section 62 and overcome any water tension forces placed upon support material 16. However, such continuity is greatly reduced due to the finite length of strips of food 14 and support material 16 after cutting by the water knife of cutting section 64. Thus, provisions must be made to prevent any tension forces between support material 16 and the bottom plate or anvil of cutting section 64 of a strength which may result in the strips of food 14 and support material 16 to stick to and bunch up on the bottom plate or anvil. In the most preferred form, the upper surface of the bottom plate or anvil upon which support material 16 moves is textured or dimpled to provide multiple depressions therein to break any water film/surface tension or any other tension between the bottom plate or anvil and support material 16. Also, in using a water knife, it is also important that the bottom plate or anvil have a groove that conforms to the cutting path of the water knife. The groove should be narrow in the order of 0.005 inch (0.013 centimeters). If wider such as resulting from a machine cut, for example in the order of 0.25 inch (0.64 centimeters), the strips of food 14 and support material 16 tend to catch on the groove. Also, excessive turbulence can be created in the water catcher of the water knife if the groove is too wide which in turn can cause blow back which can undesirably float the strips of food 14 and support material 16 on the bottom plate or anvil causing misalignment. Excessive water blow back can also increase the generation of water vapor which landing upon the product can cause the product upon storage to become sticky or even moldy.

After cutting section 64, strips of food 14 and support material 16 pass onto a platform or conveyor which may be powered or driven and include a vacuum. Strips of food 14 and support material 16 pass into and apparatus 10 further includes a labeler 66. In labeler 66, a label 68 is applied to the trailing end of each strip of food 14 and support material 16. In the preferred form, label 68 includes a portion which is adhered to support material 16 and a trailing portion which extends beyond the trailing end of the strip of food 14 and support material 16 and which has exposed adhesive on its upper surface. The function of the trailing exposed adhesive portion is described hereinafter in connection with the description of the finished rolled product.

In the most preferred form, the strips of food 14 and support material 16 are advanced onto a platform or conveyor under and apparatus 10 includes a label presser 70. Specifically, after label 68 is applied by labeler 66, the strips of food 14 and support material 16 pass under a series of spaced, parallel rollers 72 which are initially elevated above the strips of food 14 and support material 16. As the strips of food 14 and support material 16 pass under rollers 72, the rollers 72 are reciprocated downward to engage food 14 above label 68 and sandwich food 14 and support material 16 between roller 72 and label 68 for insuring that label 68 is adhered to the strip of support material 16. After labels 68 have moved past rollers 72, rollers 72 are again raised to allow passage of the next strips of food 14 and support material 16 where the pressing operation can again be performed.

After the application of labels 68 by labelers 66 and the pressing of labels 68 by label presser 70, the strips of food 14 and support material 16 are simultaneously rolled in a roll-up section 74 into multiple, independent rolls or coils. Now referring in particular to FIGS. 1 and 2, in the most preferred form, roll-up section 74 includes a rotatable tuning fork 76 including first and second spaced, parallel legs or tines 78 and 80 having a length at least equal to the combined transverse widths of the strips of food 14 and support material 16 located on the conveyor. Fork 76 is rotatable by a motor 81 about an axis 82 located parallel to and intermediate legs 78 and 80. Fork 76 is reciprocated between a first, engaged position extending transversely across the conveyor and in line with the path of the strips as shown in FIG. 1 and a second, disengaged position located to one side of and perpendicular to the conveyor as shown in FIG. 2 and transversely spaced from the first, engaged position. In the most preferred form, fork 76 is rotatably mounted to and motor 81 is mounted to a slide 84 which is slideably mounted in stationary slide tracks 86. Slide 84 and fork 76 and motor 80 mounted thereto are reciprocated in slide tracks 86 by any suitable means such as a first, double-action pneumatic cylinder 88 as shown.

Roll-up section 74 further includes a pressure plate 90 which in the preferred form is L-shaped having a width generally equal to the length of legs 78 and 80 and at least equal to the combined widths of the strips of food 14 and support material 16 located on the conveyor. Pressure plate 90 is reciprocal between a first, inner position adjacent to fork 76 in its first, engaged position and a second, outer position longitudinally spaced from fork 76 in the first, engaged position of fork 76. Pressure plate 90 is reciprocated by any suitable means such as a second, double-action pneumatic cylinder 92 as shown.

Roll-up section 74 also includes a guide member 94 which in the preferred form is removable from the path of the strips of food 14 and support material 16. In the preferred form, guide member 94 includes a series of tabs or fingers 96 corresponding to the number and positioning of spaces between the strips of food 14 and support material 16. Fingers 96 are mounted in a spaced, parallel relation to an attachment bar 98. Bar 98 is reciprocated between upper and lower positions by any suitable means such as a third, double-action pneumatic cylinder 100 as shown. In the upper position of bar 98, fingers 96 extend through apertures 102 to extend above the upper surface of the conveyor provided to roll-up section 74. In the lower position of bar 98, fingers 96 are at a level below the upper surface of the conveyor.

In the operation of roll-up section 74, after the leading ends of the strips of food 14 and support material 16 pass fingers 96 to prevent the leading ends from abutting with fingers 96, fingers 96 of guide member 94 are raised by positioning bar 98 in its upper position. Fingers 96 will be inserted in the spaces between the strips of food 14 and support material 16. Thus, fingers 96 separate the strips of food 14 and support material 16 and keep the strips of food 14 and support material 16 in their individual lanes and prevent them from telescoping and becoming intertwined. Keeping the strips of food 14 and support material 16 in their individual lanes is especially important where, as here, the axial width of the strips is minimal in comparison to their lengths and the diameter of the rolls to insure that the strips are not rolled into each other. The leading ends of the strips of food 14 and support material 16 extend towards fork 76 and between legs 78 and 80, with fork 76 located in its first, engaged position as shown in FIG. 1 and being stationary with legs 78 and 80 being located in a single, generally vertical plane with one of legs 78 and 80 located below the conveying surface of the strips and the other located above the conveying surface of the strips. At that time, fork 76 is rotated about axis 82. It can then be appreciated that strips of food 14 and support material 16 will then roll around their leading ends on and around legs 78 and 80 of fork 76 into coils as fork 76 is rotated. In the most preferred form, legs 78 and 80 are spaced relative to the length of the strips of food 14 and support material 16 requiring approximately 15 rotations of fork 76 to completely roll the strips of food 14 and support material 16 on fork 76. Further, step motor 81 rotates fork 76 at adjustable speeds, with the speed on the first rotation of fork being about 800 RPM and slowing so that on about the eighth rotation, the speed of fork 76 is about 390 RPM. On approximately the 10th rotation, pressure plate 90 is advanced by cylinder 92 from its second, outer position to its first, inner position. In its first, inner position, plate 90 places pressure on the rolling, rolled-up strips of food 14 and support material 16. Thus, fork 76 acts as a rotating anvil and with plate 90 sandwiches the rolled-up strips of food 14 and support material 16 therebetween to adhere the exposed adhesive on the upper surface of the trailing end portion of label 68 to support material 16 to thus secure strips of food 14 and support material 16 in a rolled or coiled condition. After fork 76 has rotated the desired amount of times to insure that the strips of food 14 and support material 16 have been completely rolled and labels 68 secured, rotation of fork 76 is slowed to a complete stop. At that time, fingers 96 are retracted below the upper surface of conveyor 60 by positioning bar 98 in its lower position by cylinder 100. Further, pressure plate 90 is moved from its first, inner position to its second, outer position by cylinder 92. Similarly, fork 76 is axially slid from the rolled food item by reciprocating fork 76 transversely from its first, engaged position shown in FIG. 1 to its second, disengaged position shown in FIG. 2 by cylinder 88, with the individual, rolled, strips of food 14 and support material 16 falling from fork 76 as it is retracted, with the rolls falling onto a suitable collector means or removal conveyor, not shown. In the most preferred form, fork 76 is reciprocated through a hole 104 in stationary frame 106, with the rolled, strips of food 14 and support material 16 abutting with frame 106 and axially sliding from fork 76 as fork 76 is transversely reciprocated within hole 104. After fork 76 has reciprocated to its second, disengaged position as shown in FIG. 2 to insure that all rolled, strips of food 14 and support material 16 have fallen therefrom, fork 76 is moved back to its first, engaging position of FIG. 1 by cylinder 88, with legs 78 and 80 located in the single, generally vertical plane to accept the leading ends of the next strips of food 14 and support material 16. It can be appreciated that motor 81 must control the precise end position(s) of legs 78 and 80 of fork 76.

In highly preferred embodiments, apparatus 10 can further include an embosser 108 which embosses figures or shapes on each strip of food 14 prior to its entering roll-up section 74. In the preferred form as shown in FIG. 1, embosser 108 is located between cooling tunnel 58 and first cutting section 62. In the preferred form, embosser 108 cuts the figure(s) all the way through the strip of food 14 without cutting support material 16 such that as the strip of food 14 is pulled from support material 16 during consumption, the figure(s) remains on support material 16. It can be appreciated that embosser 108 importantly provides further play value to the food item inasmuch as the figures can be played with and separately eaten from the remaining strip of food 14. Further, the figures created by embosser 108 can be rapidly and conveniently varied and changed according to market appeal. Each strip of food 14 can be embossed with the same figure(s) or each strip of food 14 can be embossed with a different particular figure.

It should be recognized that a series of individual conveyors advance the strips of food 14 and support material 16 between the sections of apparatus 10. It can be further appreciated that the speeds of the individual conveyors can be increased after the strips of food 14 and support material 16 have been cut into lengths to space out the lengths and create gaps between the lengths of the strips of food 14 and support material 16. It should also be recognized that the operation of cutting section 62, labeler 66, label pressure 70, and roll-up section 74 can be controlled according to the movement of the strips of food 14 and support material 16 by any suitable means such as a conventional programmable logic controller.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method for fabricating a rolled food item comprising the steps of: supplying a continuous sheet of support material; depositing continuous, multiple strips of food onto the continuous sheet of support material; cutting the continuous sheet of support material between the strips of food to form continuous, multiple strips of support material and food supported thereon; cutting the continuous, multiple strips of support material and food into lengths having leading ends and trailing ends; and simultaneously rolling the lengths of multiple strips of support material and food into multiple, independent coils.

2. The method of claim 1 wherein the rolling step comprises the step of simultaneously rolling the lengths of multiple strips of support material and food around the leading ends into the multiple, independent coils; and wherein the method further comprises the steps of: attaching a label to each of the trailing ends of the support material of the lengths of multiple strips of support material and food prior to the rolling step, with each label including a trailing portion extending beyond the trailing end of the support material; and adhering the trailing portion of the label to the support material after the rolling step.

3. The method of claim 1 wherein the rolling step comprises the sub-steps of: simultaneously extending the leading ends of the lengths of the strips of support material and food between a first leg and a second leg of a fork; rotating the fork about an axis parallel to the first and second legs until the lengths of the strips of support material and food are wound on the fork into a plurality of rolls; and axially sliding the fork relative to the plurality of rolls.

4. The method of claim 3 wherein the method further comprises the steps of: attaching a label to each of the trailing ends of the support material of the lengths of multiple strips of support material and food prior to the rolling step, with each label including a trailing portion extending beyond the trailing end of the support material; and placing pressure on the rolls prior to the axially sliding step to adhere the trailing portions of the labels to the support material, with the fork acting as an anvil for sandwiching the rolls.

5. The method of claim 4 further comprising the step of pressing the food and support material adjacent to the trailing ends of the lengths of the multiple strips of support material and food to adhere the labels to the support material.

6. The method of claim 3 further comprising the step of inserting a plurality of fingers between the lengths of the strips of support material and food as the leading ends are extended between the legs of the fork to keep the lengths of the strips of support material and food in their individual lanes.

7. The method of claim 1 further comprising the step of embossing figures in the strips of food prior to the rolling step.

8. The method of claim 1 wherein the depositing step comprises the steps of: rotating a first roller in a first direction, with the first roller including a plurality of spaced, parallel, circumferential lands defining depressions on the periphery of the first roller; rotating a second roller in a direction opposite to the first direction and abutting with the plurality of lands of the first roller; passing the continuous sheet of support material over the first roller and between the first and second rollers; and providing food intermediate the continuous sheet of support material and the second roller, with the food filling the depressions of the first roller as the food and the support material advance between the first and second rollers by the rotation of the first and second rollers.

9. The method of claim 8 further comprising the step of scraping the second roller at a position after the food and support material have advanced between the first and second rollers, with the periphery of the second roller being smooth.

10. The method of claim 8 wherein the food providing step comprises the step of providing food heated to a temperature to become flowable; wherein the second roller rotating step comprises the step of rotating the second roller heated to the temperature of the food; and wherein the method further comprises the step of cooling the food and support material after the food and support material have been advanced between the first and second rollers.

11. A method for fabricating a rolled food item comprising the steps of: providing a strip of support material and food, with the strip of support material and food having a leading end and a trailing end; extending the leading end of the strip of support material and food between a first leg and a second leg of a fork; rotating the fork about an axis parallel to the first and second legs until the strip of support material and food is wound on the fork into a roll; and axially sliding the fork relative to the roll.

12. The method of claim 11 further comprising the steps of: attaching a label to the support material of the trailing end of the strip prior to the rotating step, with the label including a trailing portion extending beyond the trailing end of the strip; and placing pressure on the roll to adhere the trailing portion of the label to the support material, with the fork acting as an anvil for sandwiching the roll.

13. The method of claim 12 further comprising the step of pressing the strip of support material and food adjacent to the trailing end to adhere the label to the support material prior to the rotating step.

14. The method of claim 11 wherein the strip-providing step comprises the step of providing a multiplicity of strips of support material and food, with the length of the first and second legs of the fork being equal to the axial width of the multiplicity of strips of support material and food.

15. The method of claim 14 further comprising the step of guiding the multiplicity of strips of support material and food to maintain the strips of support material and food in their individual lanes.

16. The method of claim 15 wherein the guiding step comprises the steps of providing a series of fingers upstanding from an attachment bar, with the fingers corresponding to the number and positioning of spaces between the strips of support material and food; and moving the attachment bar between a first position wherein the fingers extend between the strips of support material and food and a second position wherein the fingers do not engage the strips of support material and food.

17. The method of claim 11 wherein the axially sliding step comprises the steps of: providing a slide with the fork being rotatably mounted to the slide; and reciprocating the slide between a first position with the legs of the fork extending in line with the path of the strip of support material and food and a second position with the legs of the fork at a position transversely spaced from the first position.

18. A method for depositing continuous, multiple, spaced strips of food for support on and separable from a continuous sheet of support material comprising the steps of: rotating a first roller about a horizontal axis in a first direction, with the first roller including a plurality of spaced, continuous, parallel, circumferential, annular lands defining annular depressions on the periphery of the first roller; rotating a second roller about a horizontal axis in a direction opposite to the first direction and abutting with the plurality of lands of the first roller to define an upper, mating side and a lower, exit side; passing the continuous sheet of support material over the first roller and between the first and second rollers; and providing food to the upper, mating side of the first and second rollers intermediate the continuous sheet of support material and the second roller, with the food filling the depressions of the first roller as the food and the support material advance vertically downward between the first and second rollers by the rotation of the first and second rollers and being deposited on the continuous sheet of support material as the continuous, multiple, spaced strips by the spaced, continuous, parallel, circumferential, annular lands after exiting from between the first and second rollers.

19. The method of claim 18 further comprising the step of scraping the second roller at a position after the food and support material have been advanced between the first and second rollers, with the periphery of the second roller being smooth.

20. The method of claim 18 wherein the food providing step comprises the step of providing food heated to a temperature to become flowable; wherein the second roller rotating step comprises the step of rotating the second roller heated to the temperature of the food; and wherein the method further comprises the step of cooling and food and support material after the food and support material have been advanced between the first and second rollers.

* * * * *